United States Patent [19]

Loker et al.

[11] Patent Number: 4,564,222

[45] Date of Patent: Jan. 14, 1986

[54] SEPARABLE COUPLING FOR THIN-WALLED FLEXIBLE HOSE

[75] Inventors: Ernest B. Loker, Edgewater; Donald H. Turner, Annapolis, both of Md.

[73] Assignee: Hydrasearch Co., Inc., Annapolis, Md.

[21] Appl. No.: 644,629

[22] Filed: Aug. 27, 1984

[51] Int. Cl.[4] ............................................. F16C 33/18
[52] U.S. Cl. ..................... 285/243; 285/255; 285/347; 285/321; 29/525
[58] Field of Search ............... 285/243, 242, 255, 253, 285/252, 347, 321; 29/525

[56] References Cited

U.S. PATENT DOCUMENTS

| | | |
|---|---|---|
| 237,324 | 2/1881 | Reynolds . |
| 371,231 | 10/1887 | Turner . |
| 576,119 | 2/1897 | Hess . |
| 1,004,634 | 10/1911 | Dixon . |
| 1,286,388 | 12/1918 | Mulconroy . |
| 1,382,840 | 6/1921 | Levedahl . |
| 1,731,320 | 10/1929 | Ratcliffe . |
| 1,913,030 | 6/1933 | Hux . |
| 1,971,105 | 8/1934 | Hartman et al. . |
| 2,119,645 | 6/1938 | Pearson . |
| 2,120,275 | 6/1938 | Cowles ........................ 285/243 X |
| 2,358,575 | 9/1944 | Hurley . |
| 2,453,997 | 11/1948 | MacWilliam . |
| 2,562,116 | 7/1951 | Nelson . |
| 2,819,916 | 1/1958 | Seifert . |
| 3,073,628 | 1/1963 | Cline et al. . |
| 3,140,884 | 7/1964 | Brauck . |
| 3,185,500 | 5/1965 | Luther . |
| 3,191,975 | 6/1965 | LaMarre et al. ...................... 285/243 |
| 3,222,091 | 12/1965 | Marshall ......................... 285/243 X |
| 3,224,794 | 12/1965 | Crissy . |
| 3,257,132 | 6/1966 | Lyons . |
| 3,326,006 | 6/1967 | Mount ............................. 285/382 X |
| 3,347,571 | 10/1967 | New . |
| 3,375,025 | 3/1968 | Engel . |
| 3,432,187 | 3/1969 | Mooney et al. . |
| 3,472,536 | 10/1969 | Ingram . |
| 3,495,855 | 2/1970 | Currie . |
| 3,687,491 | 8/1972 | Marshall . |
| 4,039,212 | 8/1977 | Skarud . |
| 4,139,224 | 2/1979 | Leach . |
| 4,212,487 | 7/1980 | Jones et al. ...................... 285/243 X |
| 4,486,036 | 12/1984 | Storke et al. ..................... 285/253 |

FOREIGN PATENT DOCUMENTS

| | | |
|---|---|---|
| 212881 | 2/1958 | Australia . |
| 941399 | 4/1956 | Fed. Rep. of Germany . |
| 1206234 | 12/1965 | Fed. Rep. of Germany . |
| 1101516 | 4/1955 | France . |
| 1158142 | 6/1958 | France . |
| 1558575 | 1/1969 | France . |
| 2391413 | 12/1978 | France . |
| 275802 | 8/1927 | United Kingdom . |

Primary Examiner—Thomas F. Callaghan
Attorney, Agent, or Firm—Schwartz, Jeffery, Schwaab, Mack, Blumenthal & Evans

[57] ABSTRACT

A coupling and method of coupling thin-walled/tubing and the like includes an inner member, an intermediate wedge member and an outer member in the form of a sleeve surrounding the intermediate and inner members with the tubing therebetween. The inner member is provided with a pair of tubing grooves and a seal receiving groove between the two tubing grooves or at least between one groove and the tube receiving end of the coupling. By means of annular ridges on the intermediate wedge member the tubing is forced into the tubing grooves, and by means of an annular ridge on the wedge the tubing is pressed tightly against the seal in the seal receiving groove, thus forming a fluid-tight coupling member.

19 Claims, 2 Drawing Figures

SEPARABLE COUPLING FOR THIN-WALLED FLEXIBLE HOSE

BACKGROUND OF THE INVENTION

1. Field of the Invention

This invention relates to a reusable coupling, and more particularly to a coupling for use with thin-walled flexible hose or tubing.

2. Prior Art

It is a common practice to utilize hose clamps and the like for coupling and securing relatively thick-walled rubber hoses and the like. The hose clamp can be tightened into the rubber hose wherein, by means of sufficient pressure, the hose clamp will exert sufficient force on the hose, deforming same, to create a tight seal between the hose and the article to which it is clamped. Essentially, it is the inner resilience of the hose against the nipple to which it is pressed which performs the sealing.

However, with the advent of very thin hose or tubing with a wall thickness of about 0.125 inch having, for example, a woven polyester and nylon carcass with a urethane coating (of the type sold commercially by Angus Fire Armour, Inc., under the name "CHEMI-COIL"), it is difficult to successfully utilize conventional hose clamps. There is a tendency for the coupling to leak because the tubing does not have the inner resilience referred to above relative to thick-walled hose, and hose clamps and the like cannot develop enough gripping strength to utilize the full potential of the high strength synthetic fibers.

The terms "hose" and "tubing" used throughout the application are interchangeable and designate thin-walled flexible articles primarily of nonmetallic material. What has been done in the past is to place a large number of hose clamps adjacent each other on the tubing. By sheer numbers and forces, it has been possible to secure the hose. While such procedure may be acceptable for irrigation water and the like, it is not acceptable for use with fluids which can contaminate the environment.

RELATED ART

Application Ser. No. 428,051 now U.S. Pat. No. 4,486,035 by Francis J. Storke; Ser. No. 428,053 now U.S. Pat. No. 4,486,036 by Francis J. Storke; Carl L. Grayson and Ernest B. Loker; and Ser. No. 631,005, filed July 16, 1984, by Ernest B. Loker, which applications are commonly owned, disclose similar couplings of which the instant invention is closely related. The above referred to applications and disclosures are hereby incorporated by reference.

OBJECTS AND SUMMARY OF THE INVENTION

It is an object of the instant invention to provide a coupling which produces a good seal between the tubing and the article to which it is attached.

Another object is to provide reusable couplings which can be recoupled in the field and can be assembled with no special tools.

Still another object is to provide a coupling which can withstand relatively high pressures compared to its size.

A further object is to provide means for coupling lengths of thin-walled house/tubing together which can withstand relatively high pressures with extreme longitudinal pull, such as encountered in conveying such diverse fluids as drinking water, fuel, oil or the like from off-shore vessels to installations or facilities on-shore without leakage and/or contamination of the environment.

A specific feature and object of the instant invention is the use of a plastic wedge which is positioned between the tubing and the outer member.

A coupling and method of coupling thin-walled/tubing and the like includes an inner member, an intermediate plastic wedge member and an outer member in the form of a sleeve surrounding the intermediate and the inner members with the tubing therebetween. The inner member is provided with a pair of tubing grooves and a seal receiving groove between the two tubing grooves or at least between one groove and the tube receiving end of the coupling. By means of annular ridges on the intermediate wedge member, the tubing is forced into the tubing grooves, and by means of an annular ridge on the wedge the tubing is pressed tightly against the seal in the seal receiving groove, thus forming a fluid-tight coupling member.

BRIEF DESCRIPTION OF THE DRAWINGS

The above and other objects and advantages of the invention will be appreciated from the following description and accompanying drawings, wherein.

DETAILED DESCRIPTION OF THE INVENTION

Figure 1:
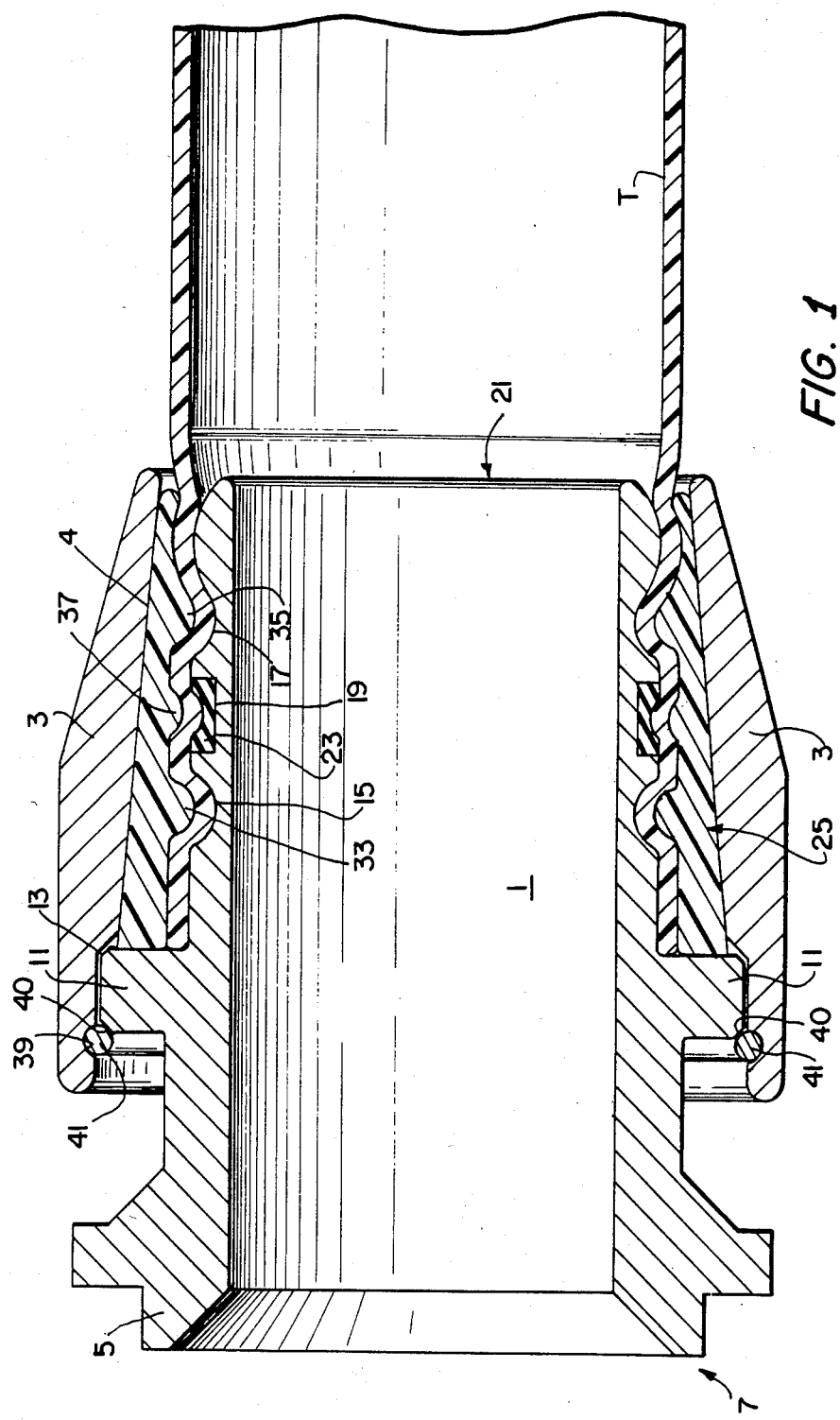
FIG. 1 is a side elevation view in cross-section of the invention.
Figure 2:
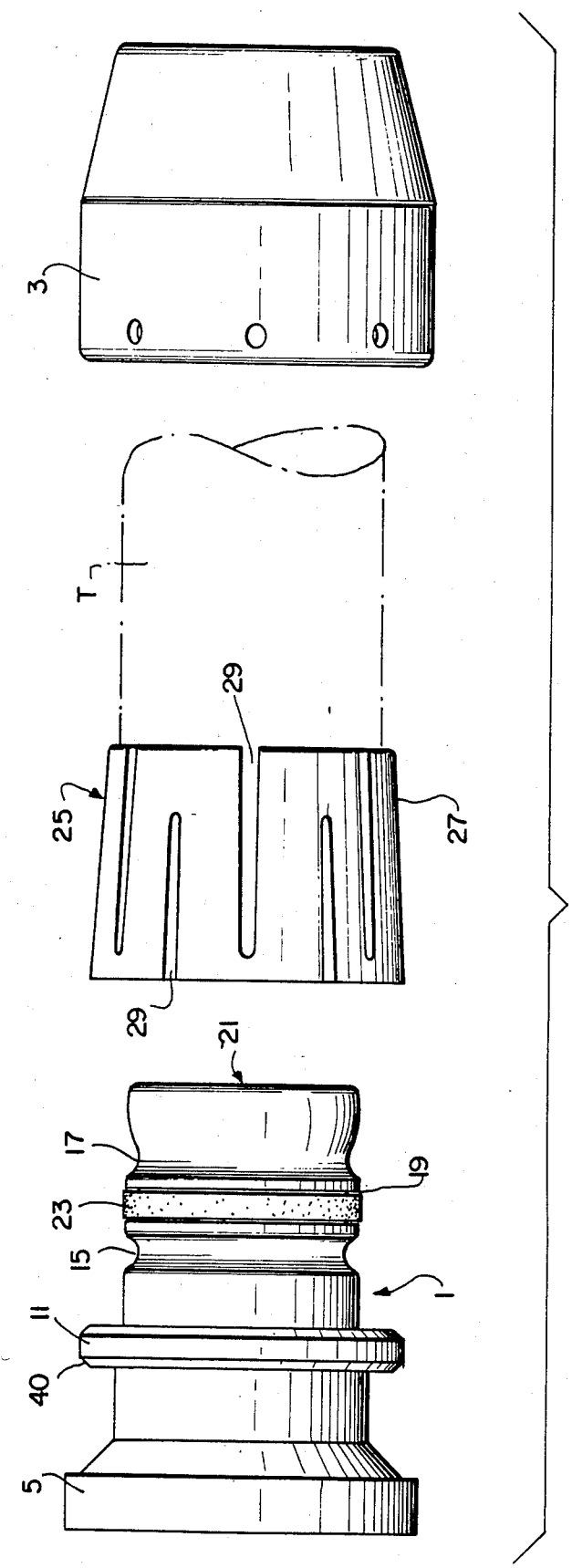
FIG. 2 is a side elevation exploded view of the invention.

Referring to FIG. 1, a coupling is seen having a first male inner member 1 of metal, surrounded by a second outer member 3 seen in the form of a metal sleeve having a tapered inner surface 4. (Obviously, inner member 1 could be the female nipple portion of the coupling as seen in FIG. 2.) A nipple 5 is essentially of standard design having a connecting portion generally seen at 7 which in turn will cooperate with the corresponding female portion. The inner member 1 includes a retainer flange 11 which rests in a groove 13 on the outer member 3.

The inner member has a first annular hose/tubing groove 15 and a second annular hose/tubing groove 17, together with a wider, generally rectangular annular seal receiving groove 19. In the modification shown in FIGS. 1 and 2 the groove 19 is between grooves 15 and 17. It will be appreciated that while this is the preferred embodiment, it may be possible to eliminate groove 17 so that the location of grooves 15 and 19 is between their present location in the drawing and the tube receiving end of the coupling seen generally at 21. A generally flat annular seal of conventional sealing material such as rubber or the like is seen at 23 in groove 19. Groove 19 is initially wider than seal 23 to thereby accommodate the seal which is compressed therein.

In the modification of the instant invention an intermediate wedge member 25 of plastic or other suitable material is positioned between members 1 and 3. Intermediate member 25 has a tapered outer surface 27 and a plurality of cut-offs 29 to form segments and to permit it to conform with outer member 3 when the members are joined together to retain tubing T.

The intermediate wedge member 25 further includes a first annular ridge 33 and a second annular ridge 35 on the inner surface thereof which cooperate with grooves 15 and 17, respectively. A third annular ridge 37 cooperates with seal 23 and seal receiving groove 19 in the manner discussed below.

A ring groove 39 on outer member 3 cooperates with a tapered face 40 on flange 11 and retaining ring 41 to locate the outer sleeve 3 and interlock the nipple 1 with the outer sleeve 3. Since pressure is directed to the left in FIG. 1, the tendency is to push member 1 to the left (i.e., off the hose). Thus, by coupling the sleeve 3 to member 1 by means of ring 41, sleeve 3 exerts an additional force on wedge 25, further compressing the tubing T into groove 15 and 17, as well as increasing the seal gripping effect.

OPERATION

The annular seal 23 is positioned in groove 19, and the outer sleeve member 3 is slid over tubing T. The segmented wedge member 25 is then slid over the tubing. The inner nipple member 1 is next inserted into the tubing. The segmented wedge member 25 is then moved up against flange 11. The outer sleeve 3 is pulled by mechanical means over the segmented wedge 25 to the posibion seen in FIG. 1. (Alternatively, the member 1 is pushed into sleeve 3.) Finally, the retainer ring 41 is inserted into groove 39 and against tapered face 40, thus, completing locking of the assembly. The action of joining the members together causes the annular ridges 33 and 35 to force the tubing into annular grooves 15 and 17, respectively. The tubing is further stretched over and compressed into seal 23, and annular ridge 37 assists in further exerting a force on the sealing material 23 to create a fluid tight arrangement. The seal 23 thus substantially fills the groove 19 when the coupling is completely assembled.

While one embodiment of the invention has been described, it will be understood that it is capable of further modification, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A coupling for use with flexible hose, tubing and the like comprising:
   (a) a first inner member,
   (b) a second intermediate member surrounding said first member,
   (c) a third outer member surrounding said second member,
   (d) said members each having a tubing receiving end,
   (e) means for receiving and retaining tubing positioned between said first and second members, said receiving and retaining means comprising:
   1. at least one first substantially annular tubing groove on said first member,
   2. a substantially annular seal receiving groove on said first member between said tubing receiving end and said one tubing groove,
   3. a first substantially annular means on said second member cooperating with the tubing and said tubing groove for forcing the tubing into said tubing groove,
   4. sealing means in said seal receiving groove,
   5. a second substantially annular means in the form of a substantially annular element on said second member cooperating with said tubing and said sealing material for exerting a force into said sealing material.

2. A coupling as defined in claim 1 including a pair of tubing grooves and a pair of first annular means.

3. A coupling as defined in claim 2 wherein said seal receiving groove is between said pair of grooves.

4. A coupling as defined in claim 1 at least one of said annular means is a substantially annular ridge.

5. A coupling as defined in claim 1 wherein said second member is formed of plastic material.

6. A coupling as defined in claim 1 wherein said second member is in the form of a plurality of interconnected segments.

7. A coupling as defined in claim 1 wherein said sealing material is about the same thickness as the depth of said seal receiving groove.

8. A coupling as defined in claim 1 wherein said sealing material has a width substantially greater than its thickness.

9. A coupling as defined in claim 1 wherein said substantially annular means is in the form of a substantially annular ridge.

10. The coupling as defined in claim 1 wherein said intermediate and outer members have tapered outer and inner surfaces, respectively.

11. The coupling as defined in claim 1 wherein said inner member includes a tapered face and said outer member includes a ring groove; and a ring positioned in said ring groove and abutting said tapered face, whereby, in use, pressure created by fluid passing in the tubing on said inner member will exert a force on said outer member which will, in turn, exert a force on said intermediate member, thereby further compressing the tubing into said tubing receiving grooves and exerting a further force on said sealing means.

12. A method of sealing thin-walled flexible hose, tubing and the like comprising:
   (a) providing a first inner coupling member, a second intermediate coupling member surrounding said first inner coupling member, and a third outer coupling member surrounding said second intermediate member, each coupling member having a tube receiving end,
   (b) forming at least one tube receiving groove in said inner member,
   (c) forming a seal receiving groove in said inner member between said one tubing receiving groove and said tube receiving end,
   (d) forming a substantially annular ridge on said intermediate member substantially concentric with said sealing material,
   (e) inserting sealing material in said seal receiving groove,
   (f) placing said outer member over the tubing,
   (g) placing said intermediate member over the tubing,
   (h) placing said inner member inside the tubing and joining said other members together thereby forcing the tubing into said tubing groove and into said sealing material to form a tight seal between said sealing material and the tubing.

13. The method of claim 12 including forming a pair of tubing receiving grooves on said inner member.

14. The method of claim 13 including forming said seal receiving groove on said inner member between said tube receiving grooves.

15. The method of claim 12 including forming said intermediate member of plastic material and said first and second members of rigid metal.

16. The method of claim 15 including forming said intermediate member with a plurality of segments.

17. The method of claim 12 including forming said ridge on a plurality of segments forming said intermediate member.

18. The method of claim 12 including forming said intermediate and outer members with tapered outer and inner surfaces, respectively.

19. The method of claim 12 including placing a retaining ring between said inner and outer members for interlocking said inner and outer members together, whereby fluid pressure in the tubing exerts a force on said inner member which through said retaining ring, exerts a force on said outer member which, in turn, exerts a force on said intermediate member, thereby further compressing the tubing into said tubing grooves and exerting a further force on said sealing material.

* * * * *